(12) United States Patent
Drinkard

(10) Patent No.: US 12,089,581 B2
(45) Date of Patent: Sep. 17, 2024

(54) FISHING ROD AND EQUIPMENT STORAGE SYSTEMS AND METHODS FOR MAKING AND USING SAME

(71) Applicant: David Drinkard, Sour Lake, TX (US)

(72) Inventor: David Drinkard, Sour Lake, TX (US)

( * ) Notice: Subject to any disclaimer, the term of this patent is extended or adjusted under 35 U.S.C. 154(b) by 14 days.

(21) Appl. No.: 18/113,009

(22) Filed: Feb. 22, 2023

(65) Prior Publication Data
US 2024/0276964 A1    Aug. 22, 2024

(51) Int. Cl.
*A01K 97/10* (2006.01)
*A45F 5/00* (2006.01)

(52) U.S. Cl.
CPC ............... *A01K 97/10* (2013.01); *A45F 5/00* (2013.01)

(58) Field of Classification Search
CPC ............ A01K 97/00; A01K 97/10; A45F 5/00
See application file for complete search history.

(56) References Cited

U.S. PATENT DOCUMENTS

| | | | | |
|---|---|---|---|---|
| 1,198,202 A * | 9/1916 | Drinkard | ................ | A01K 97/10 224/648 |
| 2,473,977 A * | 6/1949 | Tutton | ................ | A01K 97/08 220/361 |
| 3,678,611 A * | 7/1972 | Files | ................ | A01K 97/06 224/616 |
| 3,917,134 A * | 11/1975 | Tumlinson | ............ | A01K 97/10 224/907 |
| 6,217,113 B1 * | 4/2001 | Knatz | ................ | A47C 4/52 297/118 |
| 6,269,990 B1 * | 8/2001 | Gray | ................ | A01K 97/10 224/267 |
| 6,729,064 B2 * | 5/2004 | Congialosi | ............ | A01K 97/01 224/920 |
| 8,418,899 B1 * | 4/2013 | Stamps | ................ | A45F 3/14 224/262 |
| 8,943,739 B2 * | 2/2015 | Blake, III | ............ | A01K 97/06 224/259 |
| 10,034,468 B1 * | 7/2018 | Pitts | ................ | A45F 3/047 |
| D844,746 S * | 4/2019 | Peng | ................ | D22/147 |
| 10,568,313 B2 * | 2/2020 | Erdmann | ............ | A01K 97/10 |
| 2003/0173390 A1 * | 9/2003 | Smith | ................ | A45F 5/02 224/648 |
| 2005/0145663 A1 * | 7/2005 | Samuels | ................ | A01K 97/06 224/580 |
| 2012/0043358 A1 * | 2/2012 | Kelly | ................ | A45F 3/04 224/629 |
| 2019/0231054 A1 * | 8/2019 | Walter | ................ | A01K 97/125 |
| 2019/0269119 A1 * | 9/2019 | Vandamia | ............ | A01K 97/10 |

* cited by examiner

*Primary Examiner* — Richard G Davis
(74) *Attorney, Agent, or Firm* — Kean Miller LLP; Robert Devin Ricci

(57) ABSTRACT

A fishing rod and equipment storage system is provided. The fishing rod and equipment and storage system can include, but is not limited to a vest, one or more storage compartments, one or more fishing rod holders, one or more storage containers, one or more support members, one or more straps, one or more loop systems, and one or more safety loop handles. The fishing rod and equipment storage system can allow for fishing rods to be held securely and firmly in place, limiting any jostling motion, and held above the water, limiting any potential contact with the water. In one or more embodiments, the wearable storage system is configured to allow access to the equipment and fishing rod(s) stored therein without the need to remove the wearable.

20 Claims, 14 Drawing Sheets

FISHING ROD AND EQUIPMENT STORAGE SYSTEMS AND METHODS FOR MAKING AND USING SAME

BACKGROUND

This application claims benefit of priority under 35 U.S.C. § 119(e) of U.S. Ser. No. 63/312,897, filed Feb. 23, 2023, the entire contents of which is incorporated herein by reference in its entirety

FIELD OF THE INVENTION

The present invention relates generally to a wearable storage system for fishing equipment and fishing rods. More specifically, the present invention relates to a storage system that can include one or more storage compartments for tackle, tackle boxes, and equipment, and one or more fishing rod holders that are rigidly coupled to a vest and/or support member to hold storage compartment and fishing rods in place.

DESCRIPTION OF RELATED ART

Fishing vests are known to be a convenient way for a fisherman to organize and carry fishing equipment while wading in water. However, known fishing vests lack a rigid structure sufficient to hold the fishing equipment and fishing rods in place while in use. Because of the lack of stability of the fishing rods, the rod and reels may move during operation, interfering with casting, landing, and/or netting a fish. Such also makes the fishing vests are uncomfortable, especially for long periods of use. It also makes the fishing equipment and fishing rods more susceptible to getting wet and damaged.

There is a need, therefore, for new fishing rod and equipment storage systems that can allow for fishing rods, tackle, and other equipment, in various embodiments, to be held securely and firmly in place, or at least substantially rigidly in place, limiting any jostling motion, and holding such equipment above the water, limiting any potential contact with the water, while still being accessible to the fisherman without having to remove the wearable system.

BRIEF DESCRIPTION OF THE DRAWINGS

To describe the technical solutions in the embodiments of the present invention or in the prior art more clearly, the following briefly describes the accompanying drawings required for the embodiments. A person of ordinary skill in the art may still derive other accompanying drawings from these accompanying drawings without creative efforts. It is to be noted, however, that the appended drawings illustrate only typical embodiments of this invention and are therefore not to be considered limiting of its scope, for the invention may admit to other equally effective embodiments.

SUMMARY OF THE INVENTION

Figure 1:
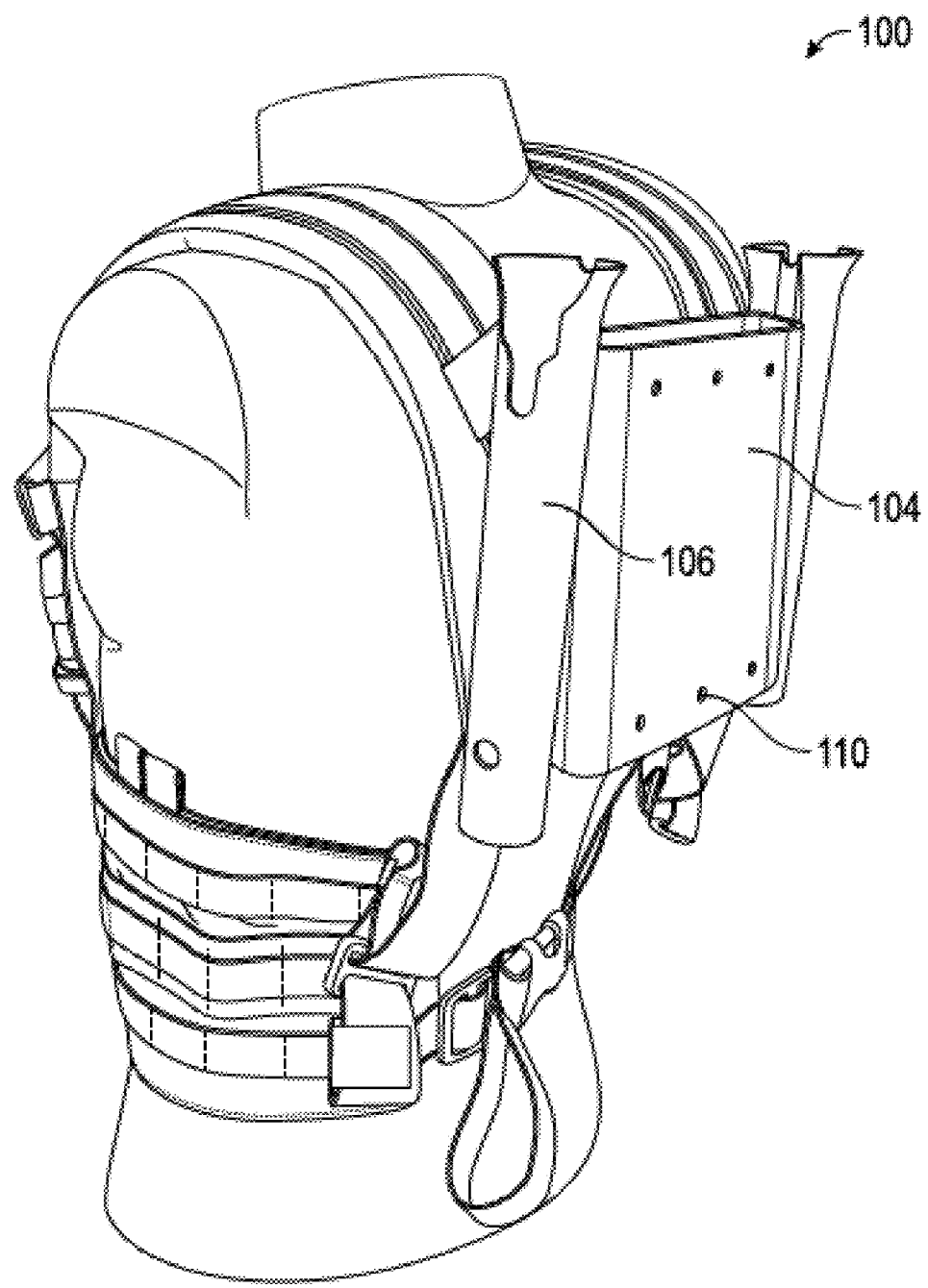
FIG. 1 is a prospective view of a fishing rod and equipment storage system according to an embodiment of the present invention.

Disclosed herein is a fishing rod and equipment storage system. In one embodiment, a fishing rod and equipment storage system can include: a vest, one or more storage compartments, one or more fishing rod holders, one or more storage containers, one or more support members, one or more straps, one or more loop systems, and one or more safety loop handles.

In another embodiment, a fishing rod and equipment storage system can include one or more storage compartments and one or more fishing rod holders, where the fishing rod holders are rigidly coupled to the storage compartments.

In another embodiment, a fishing rod and equipment storage system can include a vest and one or more fishing rod holders, where the fishing rod holders are rigidly coupled to the vest.

In another embodiment, a fishing rod and equipment storage system can include a support member and one or more fishing rod holders, where the fishing rod holders are rigidly coupled to the support member.

DETAILED DESCRIPTION OF THE INVENTION

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention.

The fishing rod and equipment storage system can include, but is not limited to, a vest, one or more storage compartments, one or more fishing rod holders, one or more storage containers, one or more support members, one or more straps, one or more loop systems, and one or more safety loop handles.

FIGS. 1-9 and 13 show a specific embodiment for a fishing rod and equipment storage system. In one or more embodiments, the fishing rod and equipment storage system 100 can include: a vest 102 attached to a storage compartment 104. The storage compartment can include a fishing rod holder 106 attached to a right side of the storage compartment 104, and a fishing rod holder 106 attached to a left side of the storage compartment 104. A storage container 108 can be placed into the storage compartment 104. The storage container 108 can be removable from the storage compartment 104. Safety loop handles 110 can be attached to the top of the vest 102.

Considering the vest 102 in more detail, the vest 102 can include, but is not limited to, one or more straps, one or more belts, one or more side panels, one or more pockets, and one or more camera attachments. The vest 102 can include a front, a back, a right, and a left side. The vest 102 can include one or more lash tabs, eyelets, grommets, carry handles, hooks, and other attachment mechanisms. The vest 102 may include a bottle pocket. The vest 102 can include a material that is suitable for long durations and provide proper support while wade-fishing. The material can be comfortable and durable for wet and dry conditions. The material can be waterproof to reduce mold or mildew. The pockets can be used for carrying tools and fishing equipment. The camera attachments can be used to secure a GOPRO® camera or other portable cameras. In one or more embodiments, the vest may comprise a material or components to render the vest buoyant. In a related embodiment, the vest may comprise floatation components suitable to make the vest buoyant. In other embodiments, the vest may comprise floatation components suitable to make the vest and the storage compartment buoyant. The fishing rod an equipment storage system may comprise flotation components designed to make at least the vest and the storage compartment buoyant, while in related embodiments, the system may comprise sufficient floatation components to make the system, the system plus tackle and rods, the user strapped into the vest, or a combination hereof, buoyant. In related embodiments the system may be employed as a life vest in the event the user were to fall in the water. The vest may also comprise one or more safety lights, beacons, or reflectors to aid in visibility of the user while in operation.

The vest 102 and/or the straps of the fishing rod and equipment storage system 100 can be used to position the storage compartment 104, the fishing rod holder 106, the storage compartment 104, and/or the one or more support members firmly between the shoulder blades of the user, where the fishing rods and fishing equipment is above the water line and out of the way of the fishing rod cast of the user. The straps of the vest 102 and/or the straps of the fishing rod and equipment storage system 100 can transfer the load to the shoulders of a user where it can be carried comfortably.

Considering the one or more storage compartments 104 in more detail, the storage compartments 104 can include various shapes. For example, the one or more storage compartments 104 can include, but are not limited to, a cube, cuboid, cylinder, and sphere. The one or more storage compartments 104 can be rigid or flexible. The one or more storage compartments 104 can include one or more interior spaces. The interior space of the storage compartment 104 can be shaped to receive the storage container 108. The one or more storage compartments 104 and/or the one or more fishing rod holders 106 can be attached to a side of the vest 102, for example, the back side of the vest 102, as shown if FIG. 1. The one or more fishing rod holders 106 can be attached to the storage compartments 104 in various positions.

In one embodiment, the one or more storage compartments 104 can include a shape with a length, a width, and a depth. The length of the storage compartment 104 can be from short of about 1 cm, about 5 cm, or about 10 cm, to a long of about 20 cm, about 40, or about 80 cm. For example, the length of the storage compartment 104 can be from about 1 cm to about 80 cm, about 3 cm to about 10 cm, about 5 cm to about 20 cm, about 10 cm to about 30 cm, about 18 cm to about 35 cm, about 25 cm to about 65 cm, and about 22 cm to about 75 cm. The width of the storage compartment 104 can be from short of about 1 cm, about 5 cm, or about 10 cm to a long of about 20 cm, about 40, or about 60 cm. For example, the width of the storage compartment 104 can be from about 1 cm to about 60 cm, about 3 cm to about 10 cm, about 5 cm to about 20 cm, about 10 cm to about 30 cm, about 18 cm to about 35 cm, about 25 cm to about 55 cm, and about 22 cm to about 45 cm. The depth of the storage compartment 104 can be from a short of about 1 cm, about 5 cm, or about 10 cm, to a long of about 20 cm, about 40, or about 50 cm. For example, length of storage compartments 104 can be from about 1 cm to about 50 cm, about 3 cm to about 10 cm, about 5 cm to about 20 cm, about 10 cm to about 30 cm, about 18 cm to about 35 cm, about 25 cm to about 55 cm, and about 22 cm to about 45 cm. In one embodiment, the one or more storage compartments 104 can include a shape with a radius. The radius of the storage compartment 104 can be from a short of about 1 cm, about 5 cm, or about 10 cm, to a long of about 20 cm, about 40, or about 80 cm. For example, the radius of the storage compartment 104 can be from about 1 cm to about 80 cm, about 3 cm to about 10 cm, about 5 cm to about 20 cm, about 10 cm to about 30 cm, about 18 cm to about 35 cm, about 25 cm to about 65 cm, and about 22 cm to about 75 cm. In one or more embodiments, the storage compartment 104 may comprise four opposing walls and a base. In other embodiments, the storage compartment 104 may include a lid, which may be removable or closable. The storage compartment 104 may include one or more drain holes which are smaller apertures located at or near the base of the storage compartment. The storage compartment may be made of plastic, molded plastic, metal, aluminum, resin, wood, or other known materials. The fishing rod holders may be a molded plastic. The fishing rod holders and the storage compartment may be molded together. The fishing rod holder(s) and the storage compartment may be molded from a single piece of plastic.

The storage compartment 104 may comprise one or more drainage holes 104a located at or near the base of the storage compartment. The storage compartment 104 may be configured to direct fluid towards at least one of the one or more drainage holes to aid in drainage. In one or more embodiments, the storage compartment 104 may comprise a slanted floor at or near the base of the storage compartment, which is configured to direct water towards the one or more drainage holes. In alternate embodiments, the storage compartment 104 may comprise a funnel or funnel-like structure which directs fluid in the storage compartment towards the one or more drainage holes.

Considering the one or more support members (not shown in Figures) in more detail, the one or more support members can include various shapes. For example, the one or more support members can include, but are not limited to, a cube, cuboid, cylinder, and sphere. The one or more support members can be rigid, flexible, semi-rigid, or semi-flexible. The one or more support members and one or more fishing rod holders 106 can be attached to a side of the vest 102, for example, the back side of the vest 102. The one or more support members can be attached the fishing rod holders 106 in various positions. The one or more support members can be substituted for the one or more storage compartments 106. In one embodiment, the vest 102 may be directly tethered to the storage compartment 104 and the fishing rod holders 106 in turn are attached to the storage compartment 104. In alternate embodiments, the fishing rod holder may be molded directly to the storage compartment. In other embodiments, such as the one depicted in FIGS. 2, 8 and 9, the storage compartment 104 is attached to the vest 102 via mechanical fasteners. Such fasteners may permanent or non-permanent. For example, the vest may be permanently attached via a permanent fastener such as a rivet. The non-permanent fasteners may include threaded fasteners, such as screws, bolts, mating fasteners such as sex bolt fasteners, or studs, which may or may not be used in connection with nuts, washers, or combinations thereof. The non-permanent fasteners may included non-threaded fasteners as well. In one or more embodiments, the fasteners may include snap fits, cantilever snap fits, annular snap fits, u-shaped snap fits, torsion snap fits, grommets, sockets, couplings, screws, screw post fasteners, sex bolt fasteners, mating fasteners, and other fasteners, while in other embodiments, simpler hanging means such as hooks, catches, clips, or even a groove and catch may be used.

In one embodiment, the one or more support members can include a shape with a length, a width, and a depth. The length of the support member can be from a short of about 1 cm, about 5 cm, or about 10 cm, to a long of about 20 cm, about 40, or about 80 cm. For example, the length of the support member can be from about 1 cm to about 80 cm, about 3 cm to about 10 cm, about 5 cm to about 20 cm, about 10 cm to about 30 cm, about 18 cm to about 35 cm, about 25 cm to about 65 cm, and about 22 cm to about 75 cm. The width of the support member can be from short of about 1 cm, about 5 cm, or about 10 cm, to a long of about 20 cm, about 40, or about 60 cm. For example, the width of the support member can be from about 1 cm to about 60 cm, about 3 cm to about 10 cm, about 5 cm to about 20 cm, about 10 cm to about 30 cm, about 18 cm to about 35 cm, about 25 cm to about 55 cm, and about 22 cm to about 45 cm. The depth of the support member can be from a short of about 1 cm, about 5 cm, or about 10 cm to a long of about 20 cm, about 40, or about 50 cm. For example, the length of support member can be from about 1 cm to about 50 cm, about 3 cm to about 10 cm, about 5 cm to about 20 cm, about 10 cm to about 30 cm, about 18 cm to about 35 cm, about 25 cm to about 55 cm, and about 22 cm to about 45 cm. In one embodiment, the one or more support member can include a shape with a radius. The radius of the support member can be from a short of about 1 cm, about 5 cm, or about 10 cm, to a long of about 20 cm, about 40, or about 80 cm. For example, the radius of the support member can be from about 1 cm to about 80 cm, about 3 cm to about 10 cm, about 5 cm to about 20 cm, about 10 cm to about 30 cm, about 18 cm to about 35 cm, about 25 cm to about 65 cm, and about 22 cm to about 75 cm.

Considering the one or more fishing rod holders 106 in more detail, the fishing rod holders 106 can include various shapes. For example, the fishing rod holder 106 can include, but is not limited to, a cube, cuboid, cylinder, and sphere. The fishing rod holder 106 can include one or more interior spaces. The interior space of the fishing rod holder 106 can be shaped to receive a fishing rod. The fishing rod holder 106 can include one or more openings. For example, the fishing rod holder 106 can have a cylinder shape with an opening at the top to receive a fishing rod. The fishing rod holder 106 can also have a smaller opening at or near the bottom to act as a drain 106a, 106b for any water that may accumulate. In one or more embodiments, the fishing rod holder 106 may be frustoconical in shape at the top, with a larger diameter at the top, tapering into a smaller diameter cylinder. In another embodiment, the fishing rod holder 106 may comprise an opening or notch 106c depending from the top a distance along at least one side to aid in the insertion and removal of the fishing rod. The fishing rod holder 106 can be rigid or flexible, or it may be semi-rigid or semi-flexible. The one or more fishing rod holders 106 can be attached to the vest 102 (not shown in Figures). The rod holder 106 can be rigidly attached to the vest 102. The rod holder 106 can be rigid and sturdy to keep rods from jostling around and secure firmly in place.

In one embodiment, the one or more fishing rod holders 106 can include a shape with a length, a width, and a depth. The length of the fishing rod holder 106 can be from short of about 1 cm, about 5 cm, or about 10 cm, to a long of about 20 cm, about 40, or about 80 cm. For example, the length of fishing rod holder 106 can be from about 1 cm to about 80 cm, about 3 cm to about 10 cm, about 5 cm to about 20 cm, about 10 cm to about 30 cm, about 18 cm to about 35 cm, about 25 cm to about 65 cm, and about 22 cm to about 75 cm. The width of the fishing rod holder 106 can be from a short of about 1 cm, about 5 cm, about 10 cm, to a long of about 20 cm, about 40, or about 60 cm. For example, the width of the fishing rod holder 106 can be from about 1 cm to about 60 cm, about 3 cm to about 10 cm, about 5 cm to about 20 cm, about 10 cm to about 30 cm, about 18 cm to about 35 cm, about 25 cm to about 55 cm, and about 22 cm to about 45 cm. The depth of the fishing rod holder 106 can be from a short of about 1 cm, about 5 cm, or about 10 cm, to a long of about 20 cm, about 40, or about 50 cm. For example, length of the fishing rod holder 106 can be from about 1 cm to about 50 cm, about 3 cm to about 10 cm, about 5 cm to about 20 cm, about 10 cm to about 30 cm, about 18 cm to about 35 cm, about 25 cm to about 55 cm, and about 22 cm to about 45 cm. In one embodiment, the one or more fishing rod holder 106 can include a shape with a radius. The radius of the fishing rod holder 106 can be from a short of about 1 cm, about 5 cm, or about 10 cm, to a long of about 20 cm, about 40, or about 80 cm. For example, the radius of the fishing rod holder 106 can be from about 1 cm to about 80 cm, about 3 cm to about 10 cm, about 5 cm to about 20 cm, about 10 cm to about 30 cm, about 18 cm to about 35 cm, about 25 cm to about 65 cm, and about 22 cm to about 75 cm.

The fishing rod holders may be made of plastic, metal, aluminum, resin, wood or other known materials. The fishing rod holders may be a molded plastic. In one or more embodiments, the fishing rod holder and storage compartment may be molded of a single piece of plastic. In other embodiments, they may be connected through plastic welding.

In one embodiment, the one or more fishing rod holders 106 can be attached to the one or more storage compartments 104 or the one or more support members where the length of the fishing rod holder 106 and the length of the storage compartment 104 or support member forms an angle. The angle between the lengths of the fishing rod holder 106 and the storage compartment 104 or support member can be from a low of about 0°, about 2°, or about 5°, to a high of about 90°, about 180°, or about 360°. For example, the angle between the length of the fishing rod holder 106 and the storage compartment 104 or support member can be from about 0° to about 359°, about 1° to about 180°, about 0° to about 90°, about 1° to about 5°, about 1° to about 5°, about 1° to about 10°, and about 1° to about 20°. The one or more fishing rod holders 106 may be attached to the one or more storage compartments 104 through an attachment means that allows for the rod holder to be rotated about an axis while still being securely attached to the one or more storage compartments 104. For example, in one or more embodiments, the rod holder may be able to be positioned parallel to the storage compartment while in use to maintain the rod and rod holder in an upright position and rotated when the user is no longer using the storage system for storage. Likewise the ability to rotate the rod holder may assist in the user's ability to load or remove the rod while in use. In such an embodiment, rod holder 106 may be able to rotate along the storage compartment 104 or support member from 360°, 0° to about 359°, about 1° to about 180°, about 0° to about 90°, about 1° to about 5°, about 1° to about 5°, about 1° to about 10°, about 1° to about 20°, about 1° to about 30°, and about 1° to about 45°.

Considering the one or more storage containers 108 in more detail, the storage container 108 can include various shapes. For example, the storage container 108 can include, but is not limited to, a cube, cuboid, cylinder, and sphere. The storage container 108 can be sized to fit within the storage compartment 104. The storage container 108 may comprise compartments for storing and separating various fishing appurtenances, such as tackle. The storage container 108 can include, but is not limited to, a lure (or tackle) box. A lure box can include boxes familiar to persons skilled in the art, which are used to carry fishing equipment, such as tackle, lures, hooks, flies, weights, leaders, and tippets.

In one embodiment, the one or more storage containers 108 can include a shape with a length, a width, and a depth. The length of the storage container 108 can be from a short of about 1 cm, about 5 cm, or about 10 cm, to a long of about 20 cm, about 40, or about 80 cm. For example, the length of the storage container 108 can be from about 1 cm to about 80 cm, about 3 cm to about 10 cm, about 5 cm to about 20 cm, about 10 cm to about 30 cm, about 18 cm to about 35 cm, about 25 cm to about 65 cm, and about 22 cm to about 75 cm. The width of the storage container 108 can be from a short of about 1 cm, about 5 cm, or about 10 cm, to a long of about 20 cm, about 40, or about 60 cm. For example, the width of the storage container 108 can be from about 1 cm to about 60 cm, about 3 cm to about 10 cm, about 5 cm to about 20 cm, about 10 cm to about 30 cm, about 18 cm to about 35 cm, about 25 cm to about 55 cm, and about 22 cm to about 45 cm. The depth of the fishing rod holder 106 can be from a short of about 1 cm, about 5 cm, or about 10 cm, to a long of about 20 cm, about 40, or about 50 cm. For example, the length of the storage container 108 can be from about 1 cm to about 50 cm, about 3 cm to about 10 cm, about 5 cm to about 20 cm, about 10 cm to about 30 cm, about 18 cm to about 35 cm, about 25 cm to about 55 cm, and about 22 cm to about 45 cm. In one embodiment, the one or more storage containers 108 can include a shape with a radius. The radius of the storage container 108 can be from short of about 1 cm, about 5 cm, about 10 cm to a long of about 20 cm, about 40, about 80 cm. For example, the radius of the storage container 108 can be from about 1 cm to about 80 cm, about 3 cm to about 10 cm, about 5 cm to about 20 cm, about 10 cm to about 30 cm, about 18 cm to about 35 cm, about 25 cm to about 65 cm, and about 22 cm to about 75 cm.

The fishing rod and equipment storage system 100 can include stainless-steel attachment rings, rivets, and plastic rings to attach the various components of the fishing rod and equipment storage system 100 to each other, such as the storage compartments 104 and/or vest and/or fishing rod holder 106.

Figure 2:
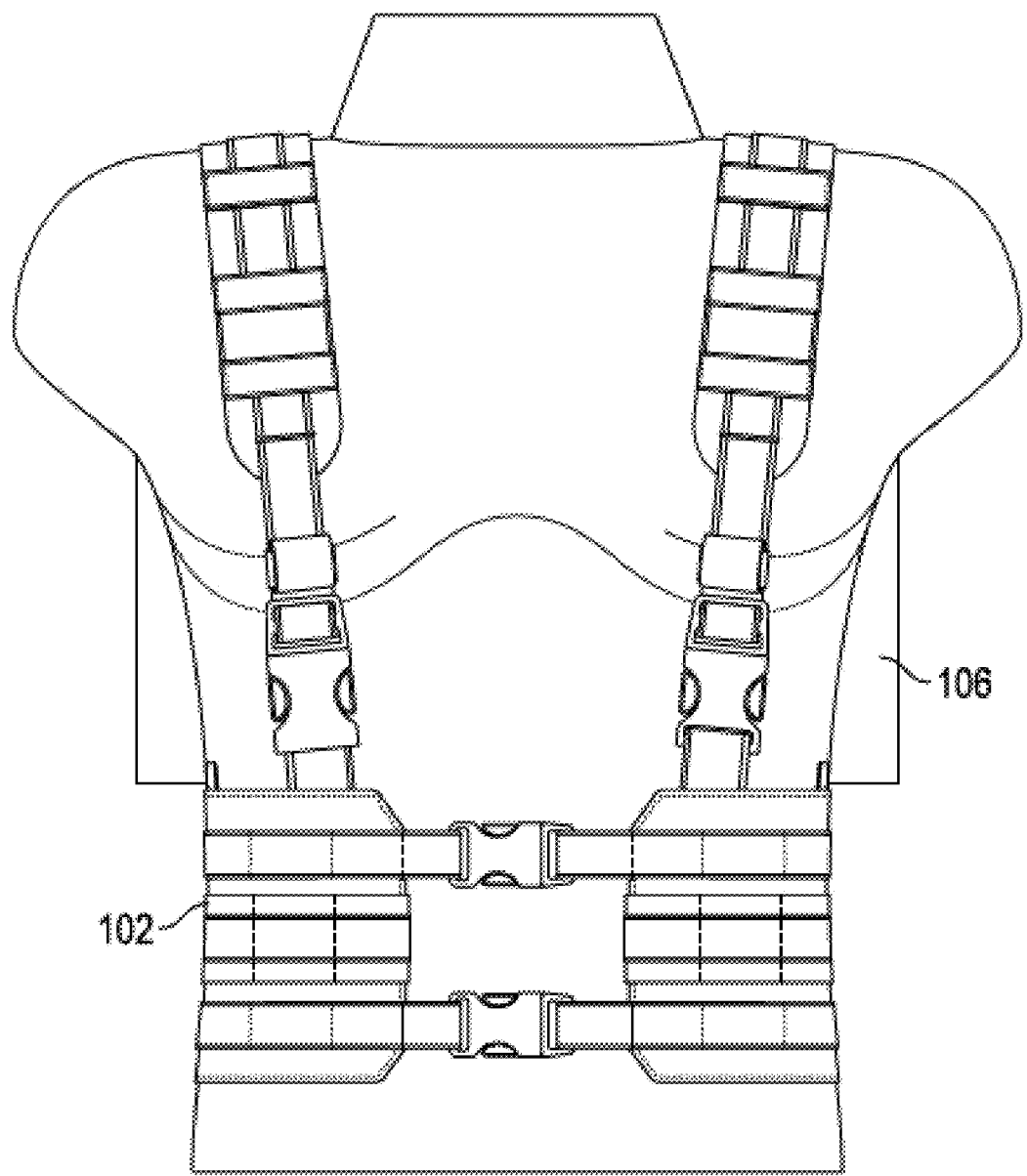
FIG. 2 is a front view of the fishing rod and equipment storage system of FIG. 1.

Considering the one or more safety loop handles 110 in more detail, the safety loop handles 110 can be attached to a side of the vest 102. For example, the safety loop handles 110 can be attached to the top portion of the back of the vest 102 as depicted in FIG. 2.

Figure 14:
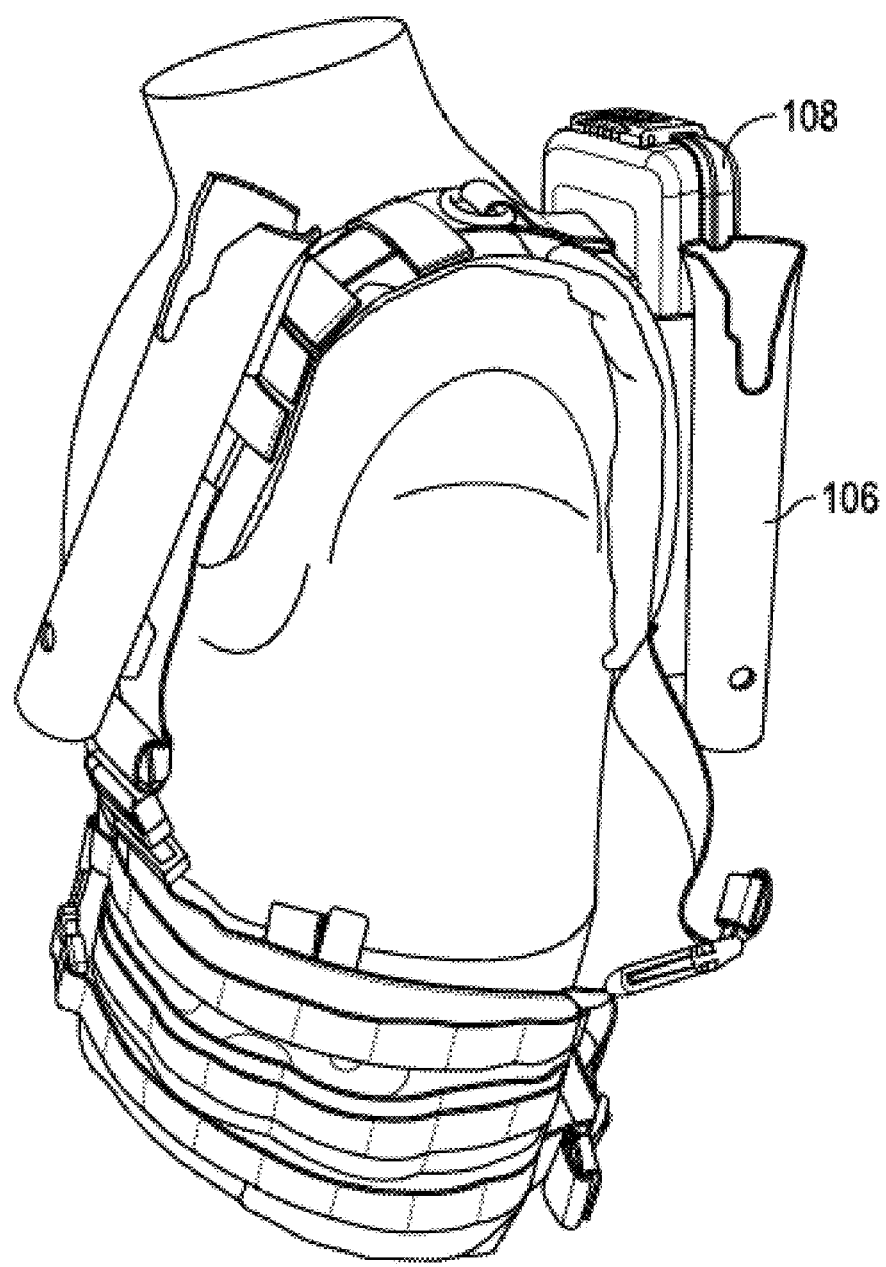
FIG. 14 is a prospective view of a fishing rod and equipment storage system with a rod holder mounted to the vest strap.

The one or more loop systems (not shown in Figures) can include, but is not limited to: one or more straps, one or more fasteners for fishing equipment, one or more stringers for fish, a landing net, a wade bag, and other fishing equipment. As depicted in FIG. 14, additional storage components such as one or more fishing rod holders may be attached to the one or more straps of the wearable (here, a vest). Such storage components may be attached through any number of fasteners, including without limitation snap fits, cantilever snap fits, annular snap fits, u-shaped snap fits, torsion snap fits, grommets, sockets, couplings, screws, screw post fasteners, sex bolt fasteners, mating fasteners, and other fasteners, while in other embodiments, simpler hanging means such as hooks, catches, clips, or even a groove and catch may be used. The storage compartment may be mounted vertically or horizontally. It may also be rotatably connected to allow the user to manipulate the orientation.

The fishing rod and equipment storage system 100 is designed to allow full use of chest waders. The design keeps rods and tackle above the water line or waves to increase life-expectancy of fish gear. The fishing rod and equipment storage system 100 can be comfortable to wear for an extended period due to the location of the tackle and rod holders sitting between the shoulder blades. The fishing rod and equipment storage system 100 can offer full back support. Placement of the fishing rod holders 106 between the shoulder blades can provide for positioning a stored fishing rod in a position such that it will not interfere with the casting of an engaged fishing rod. The fishing rod and equipment storage system 100 can provide easy access when needed, without the worry of your expensive reels and tackle being submerged in water.

Figure 3:
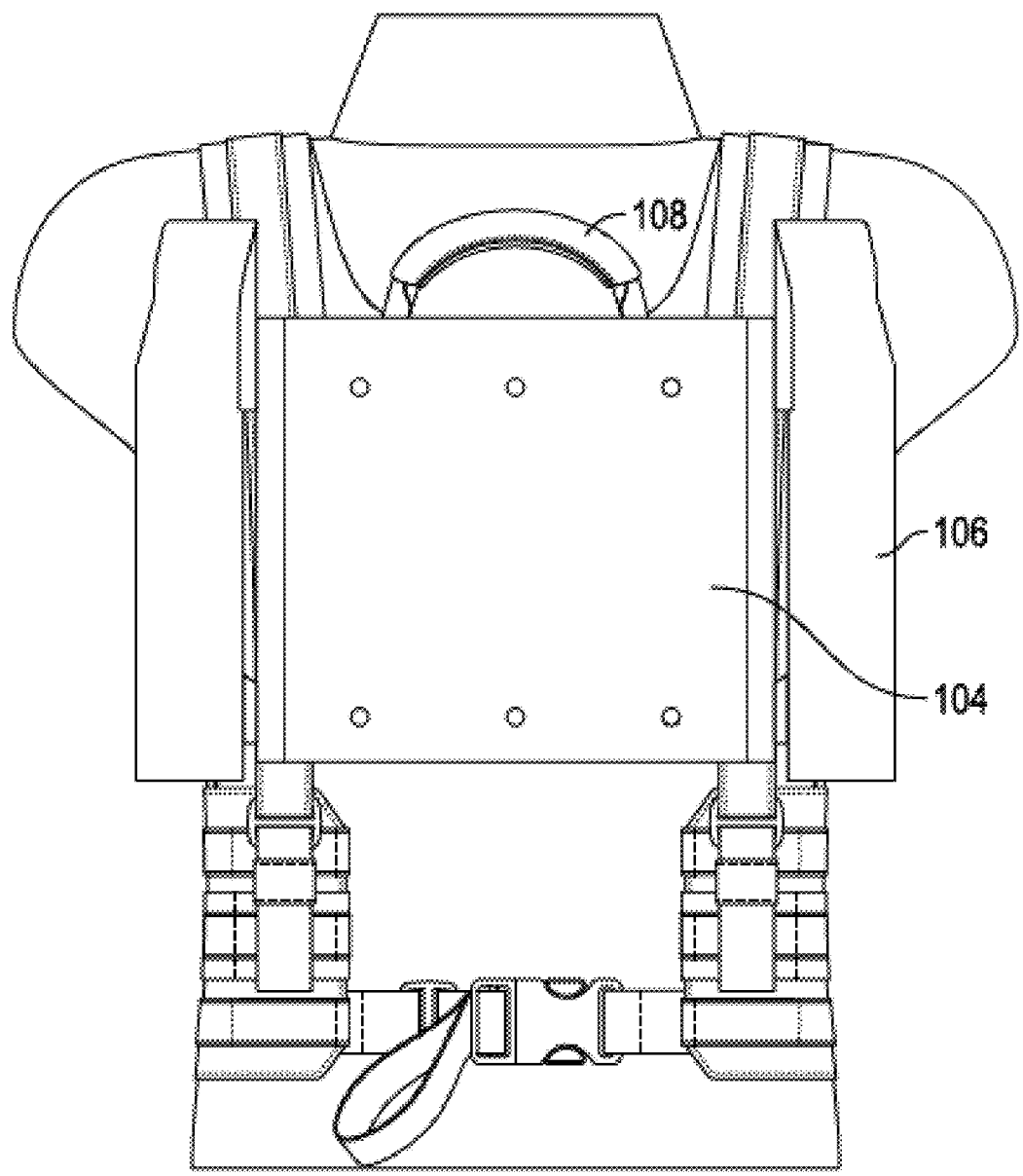
FIG. 3 is a rear view of a fishing rod and equipment storage system according to an embodiment of the present invention.
Figure 4:
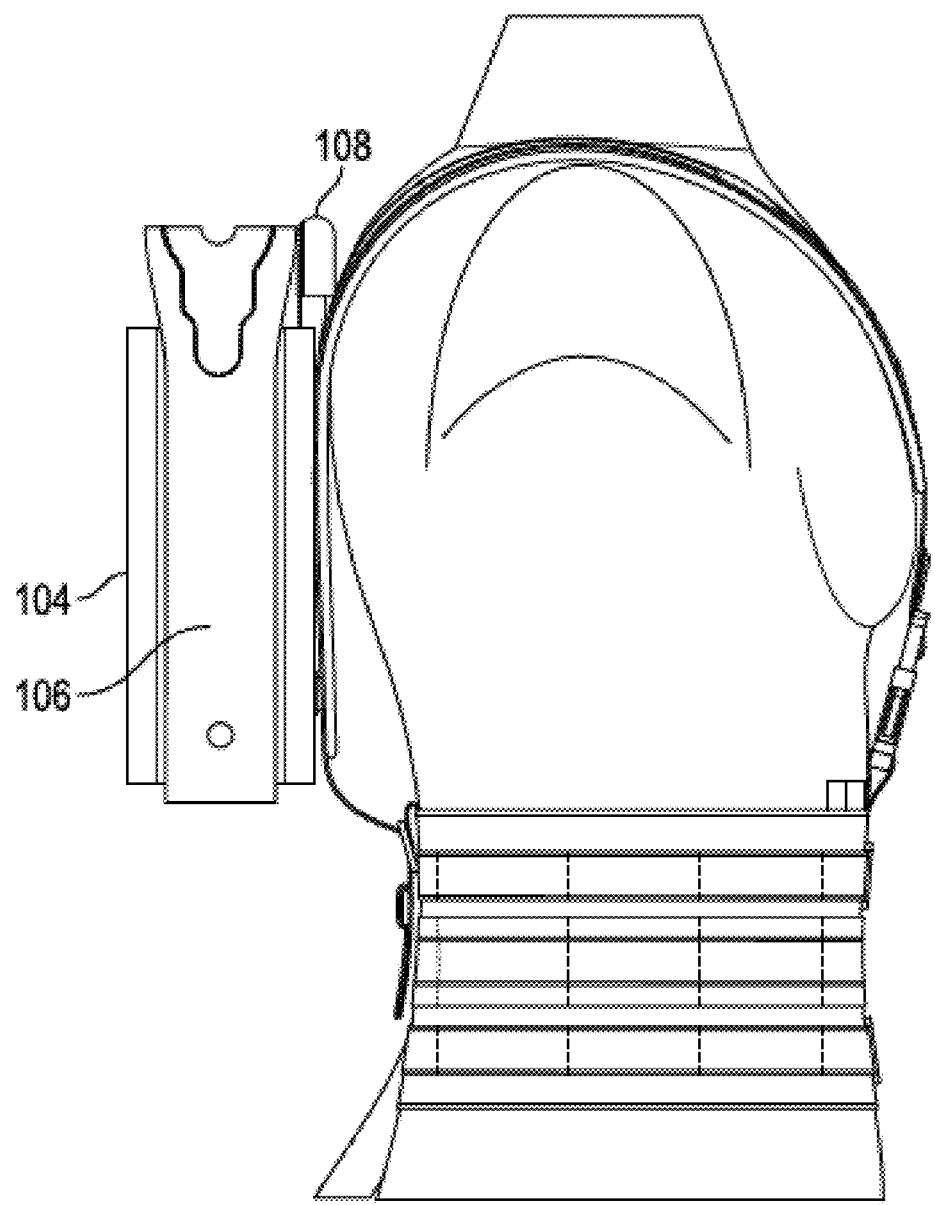
FIG. 4 is a side view of a fishing rod and equipment storage system according to an embodiment of the present invention.
Figure 5:
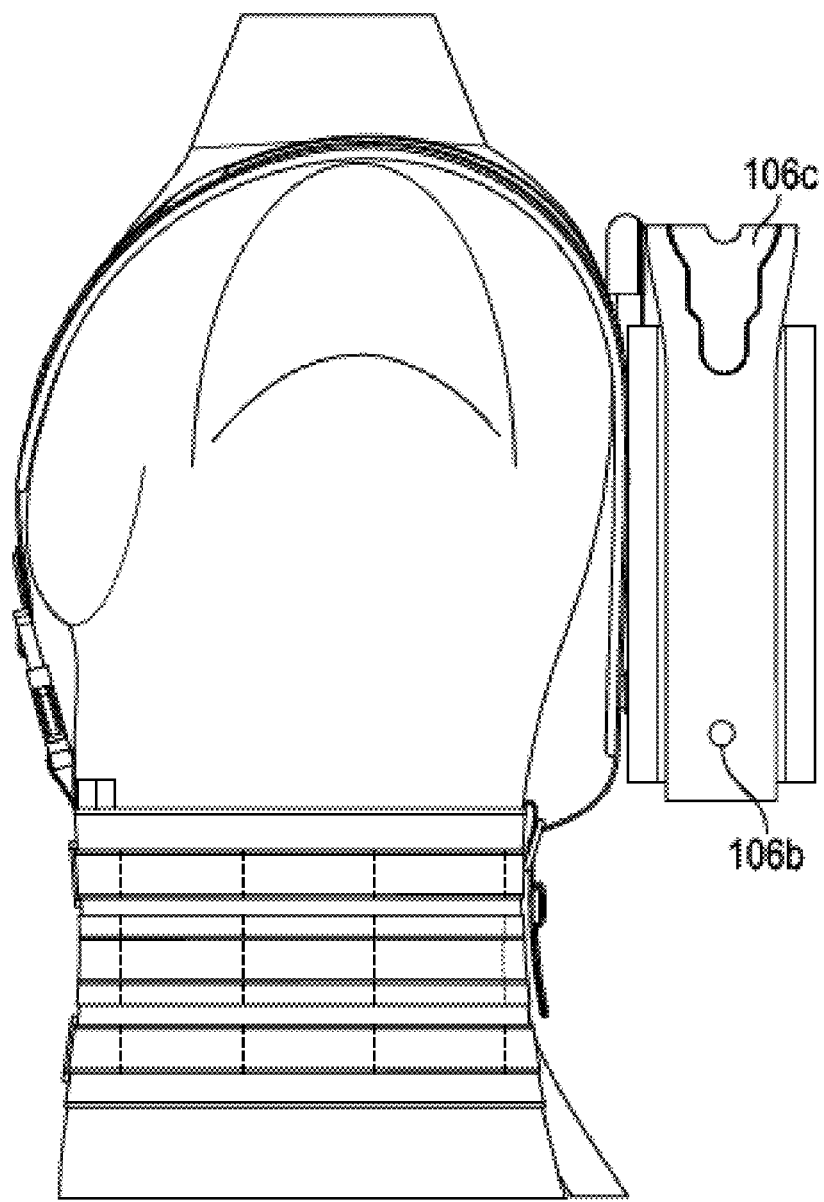
FIG. 5 is the alternate side view of the fishing rod and equipment storage system depicted in FIG. 4.
Figure 6:
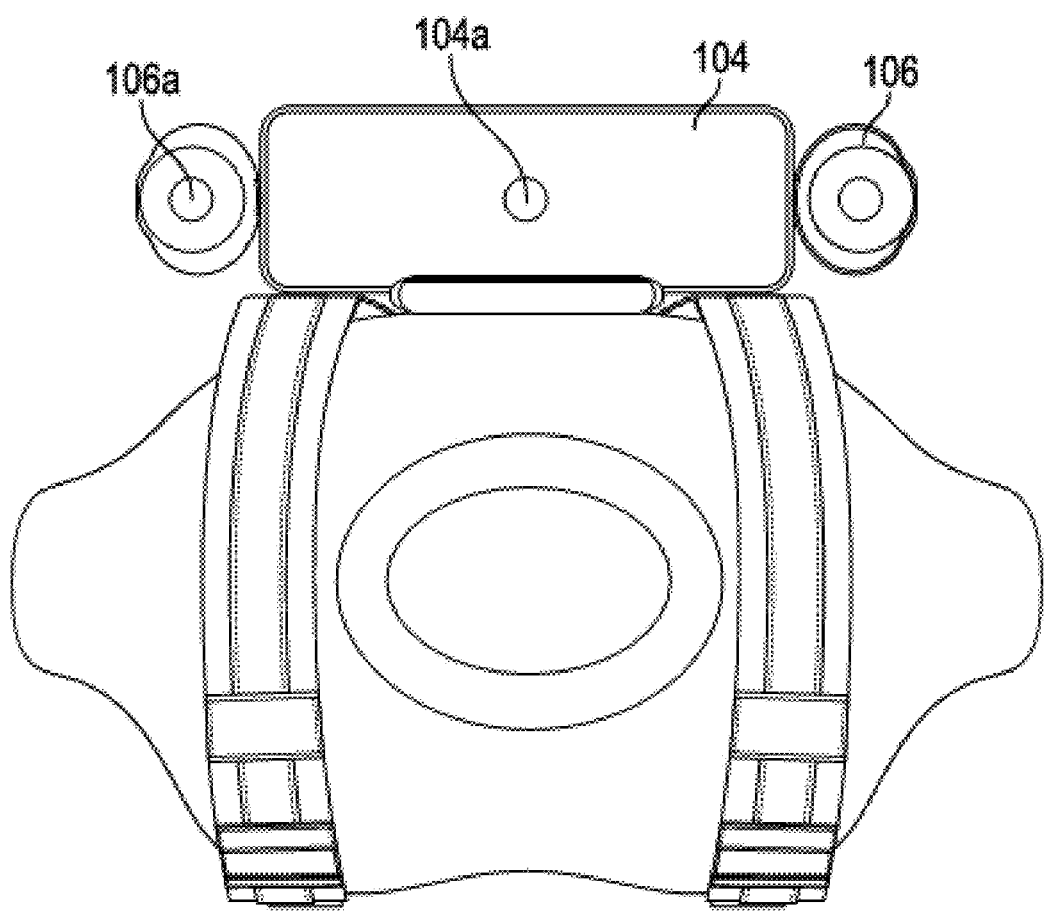
FIG. 6 is a top view of a fishing rod and equipment storage system according to an embodiment of the present invention.
Figure 7:
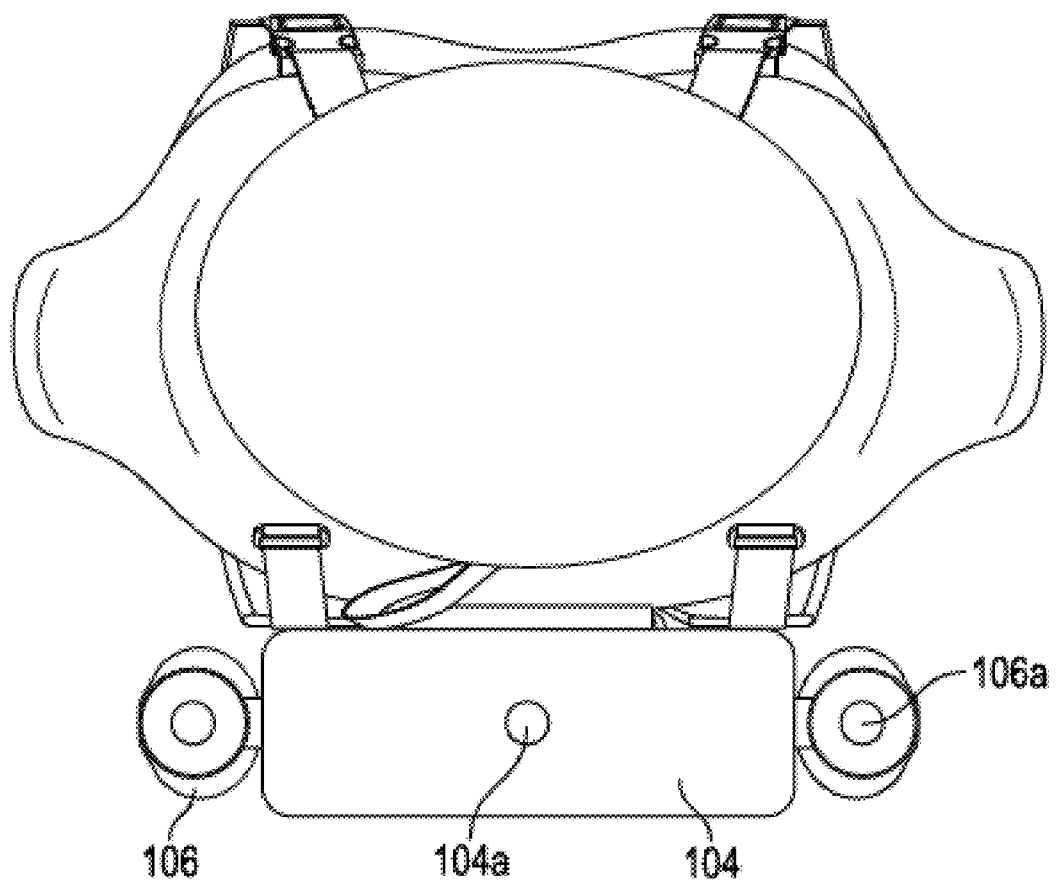
FIG. 7 is a bottom view of a fishing rod and equipment storage system according to an embodiment of the present invention with no contents within the central storage container.
Figure 8:
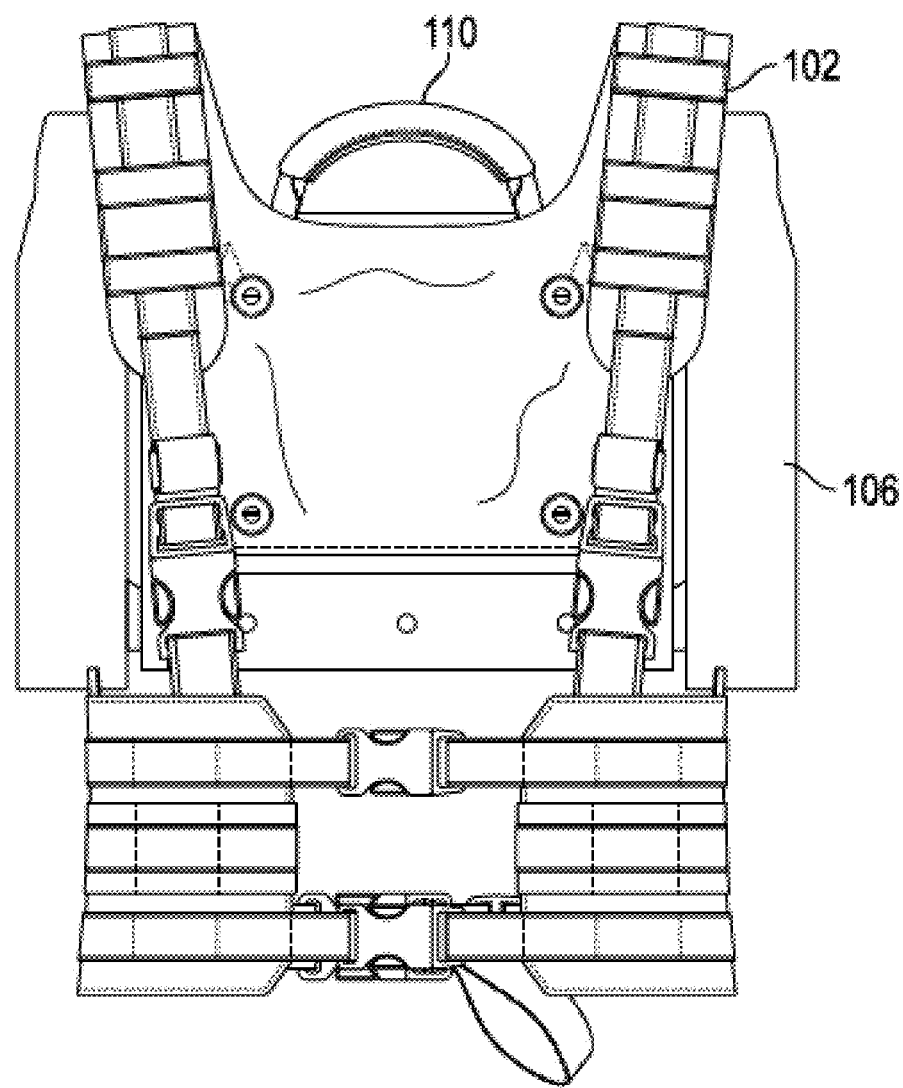
FIG. 8 depicts the same front view of FIG. 2 with the user's body removed for illustrative purposes.
Figure 9:
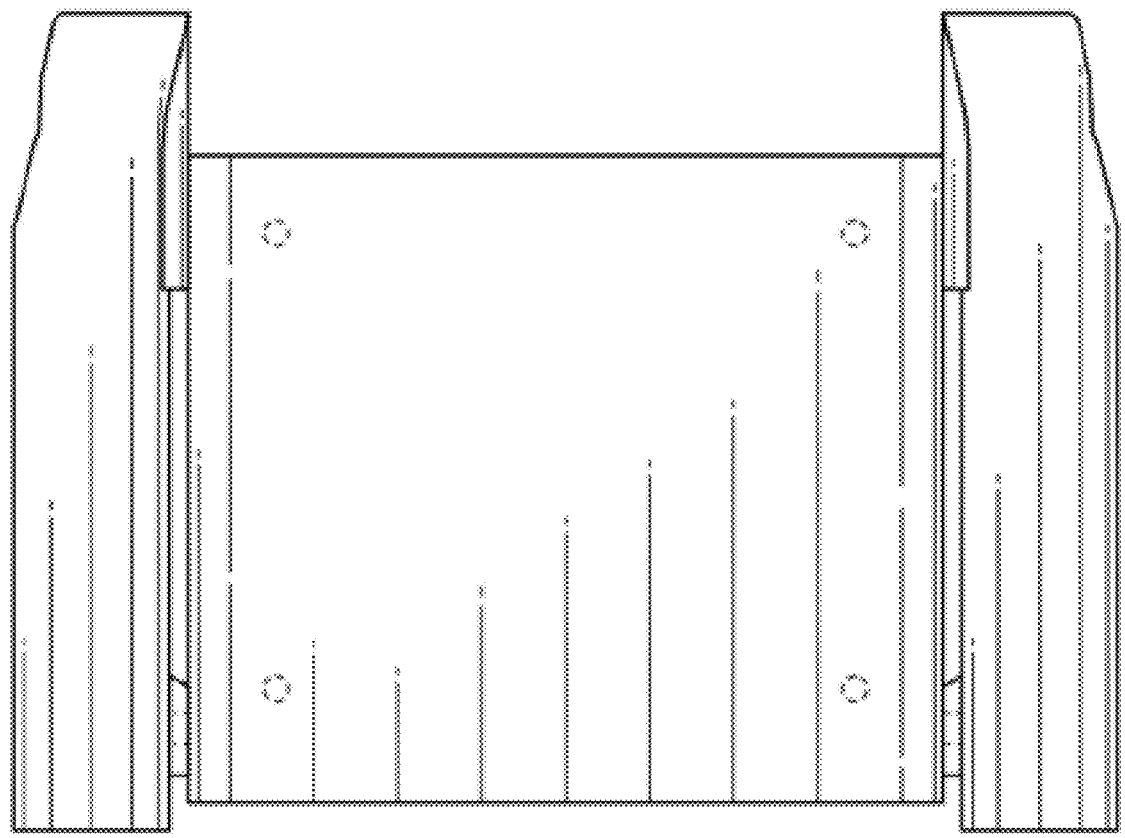
FIG. 9 depicts the interior (or front) face of the storage container with two rod holders on each side removed from the vest for illustrative purposes.
Figure 10:
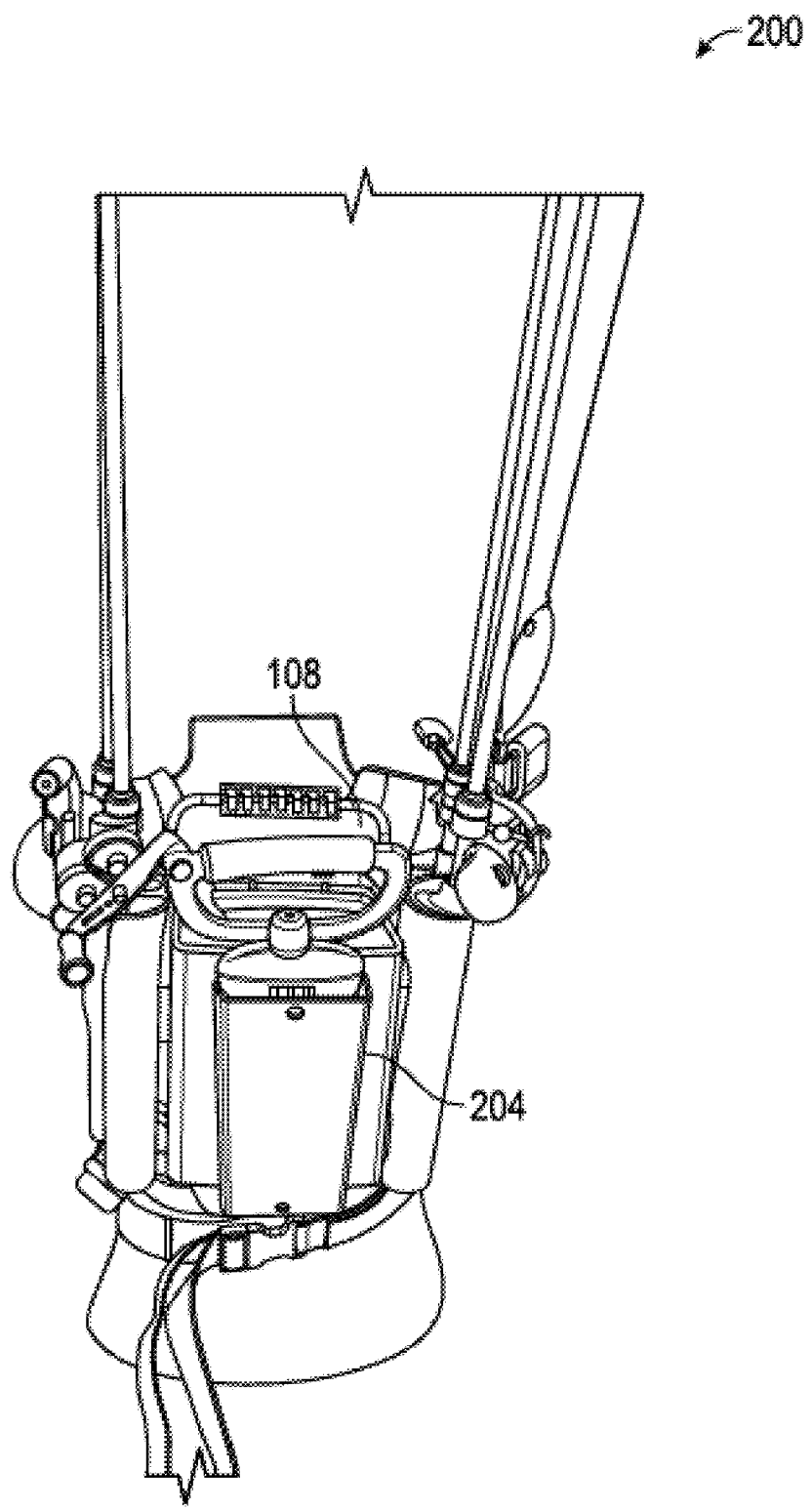
FIG. 10 depicts an alternative embodiment of a fishing rod and equipment storage system with two storage compartments, each with two rod holders and a smaller storage compartment connected to the back.
Figure 11:
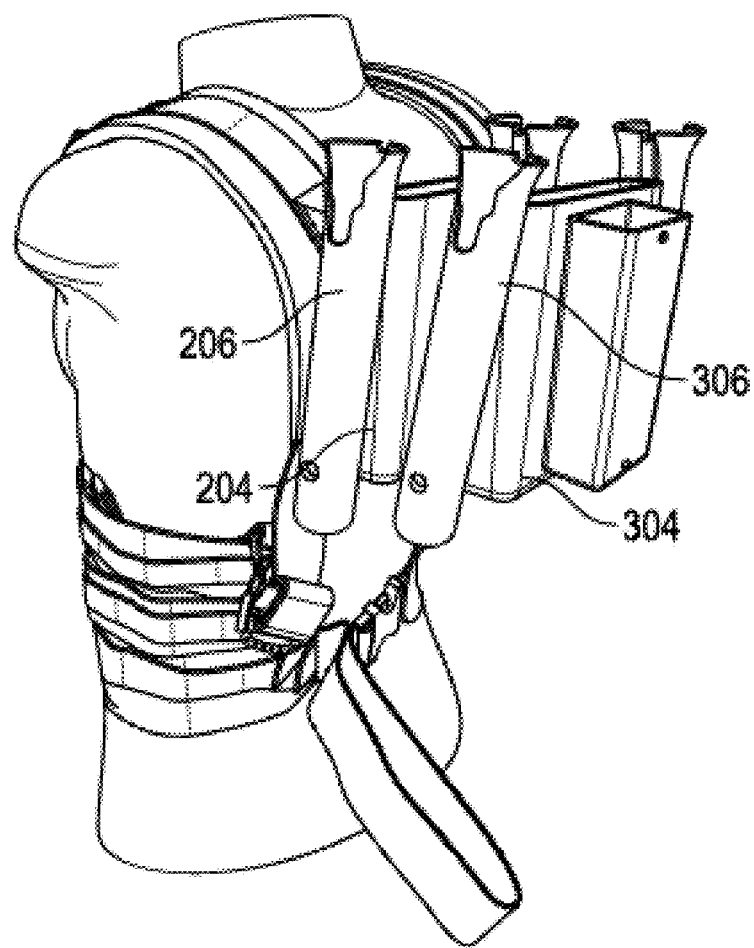
FIG. 11 is a side view of the fishing rod and equipment storage system of FIG. 10.
Figure 12:
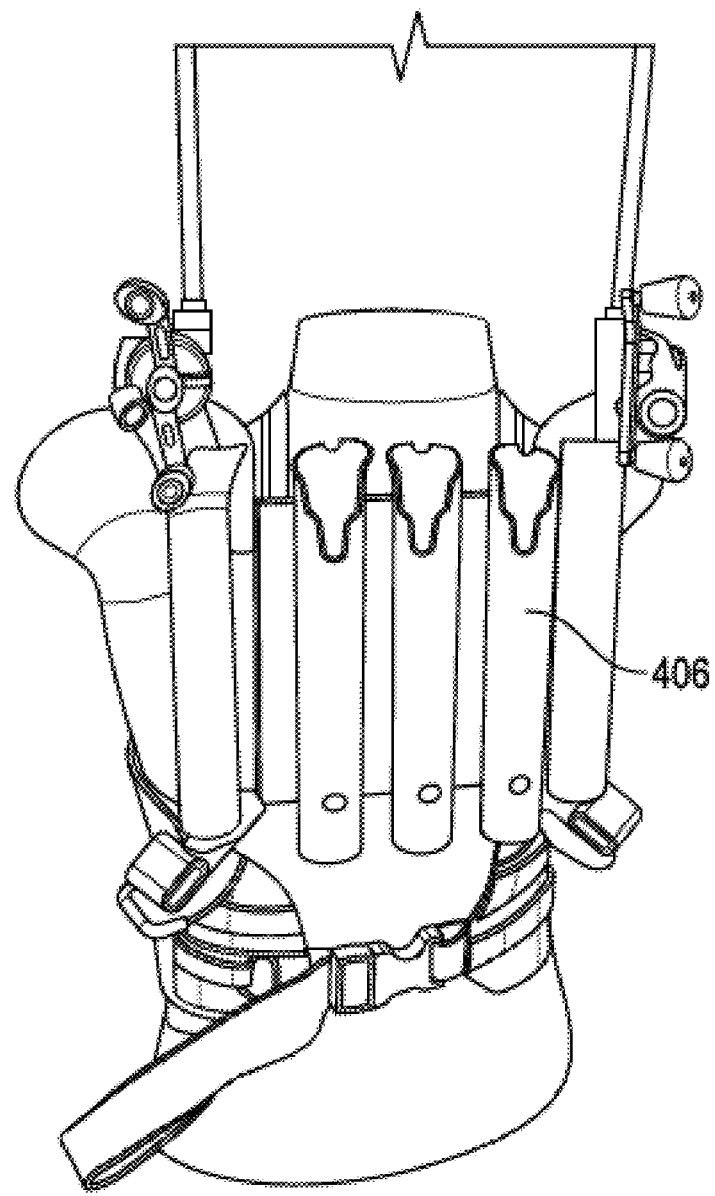
FIG. 12 depicts and alternative embodiment of a fishing rod and equipment storage system with additional rod holders connected thereto.
Figure 13:
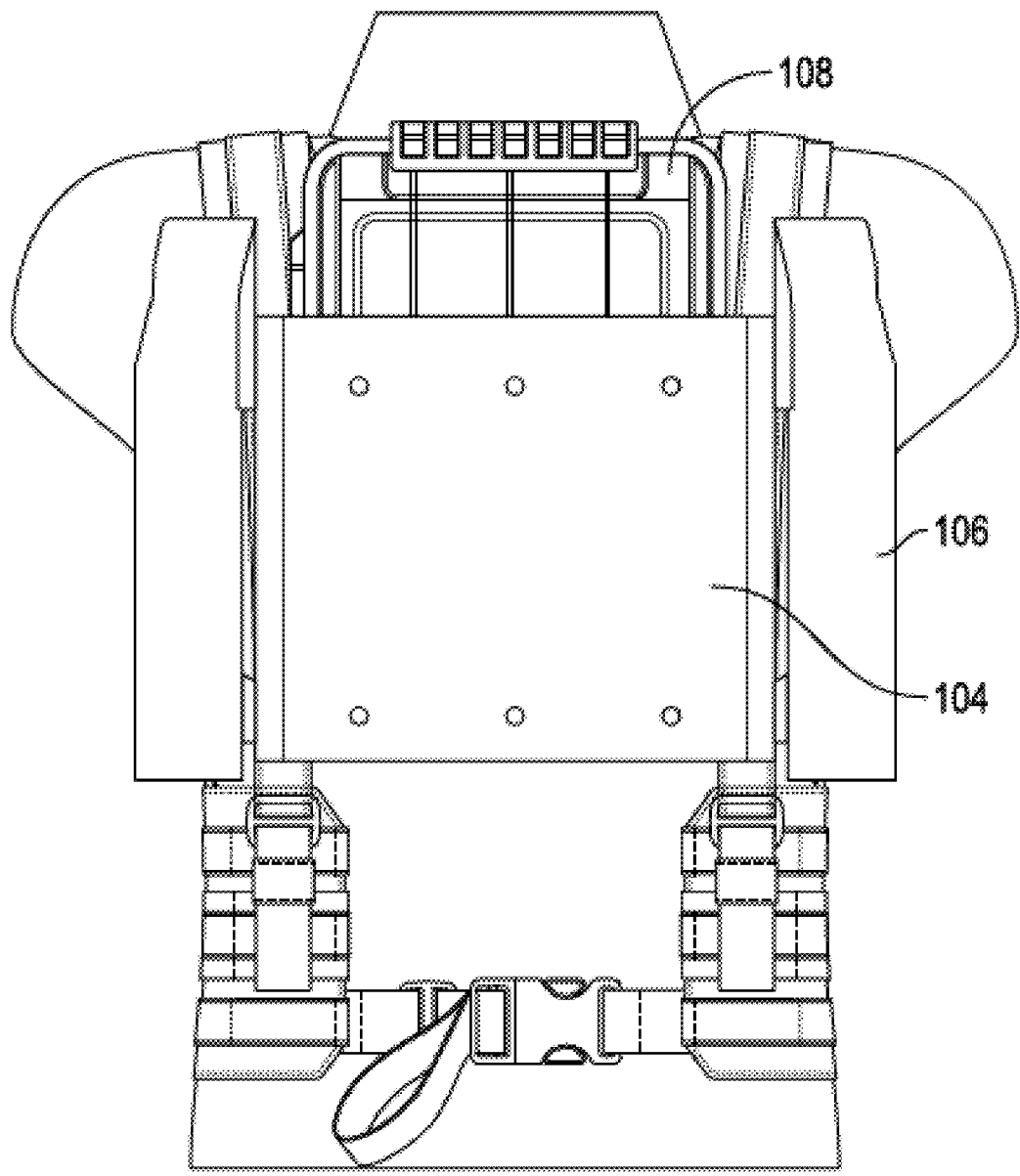
FIG. 13 is a back view of the of an embodiment of a fishing rod and equipment storage system with a tackle box inserted into the storage compartment.

Embodiments of the fishing rod and equipment storage system are presented in FIGS. 1, 3, and 10-12 which demonstrate an expansion system to allow tackle, gear, and storage accessories to readily be connected to and incorporated into the storage system. As shown in FIG. 10, a fishing rod and equipment storage system 200 is shown comprising storage compartment 204. As depicted, storage compartment 204 comprises a base from which two opposing side walls, a front wall which abuts a user's back when in use, and a back wall extend in a manner to define a container. As best shown in FIGS. 1 and 3, a plurality of expansion ports 110 (depicted as circular holes) are formed into the exterior of the back wall at predetermined lengths. These expansion (or connection) ports may serve as drainage holes in the event water were to enter the storage compartment 204. They may also serve as connection ports into or through which any one of several accessories may be connected to the storage compartment. For example, as shown in FIG. 10-11, another molded storage compartment 304 with connected rod holders 306 may be removably connected to the back wall of storage compartment 204 by engaging with one or more of the connection ports. Turning to FIG. 12, a plurality of rod holders 406 are connected the exterior of the back wall of storage compartment 304.

The storage accessories may include additional storage compartments, rod holders, cases, tackle holders, carrying cases, and boxes. Additionally, storage accessories may include tools and accessories themselves that may be connected to the storage compartment without need for additional storage containers, such as a ruler, tackle, tackle box, a hook remover, a floatation device, drink holders, safety lights or beacons, reflectors, cell phone holders, or camera mounts.

The exterior of the back wall (i.e., the side opposite the vest) of storage compartment 304 may comprises mounting mechanisms which are designed and positioned to mate with or connect to or through one or more corresponding connection ports. In a preferred embodiment, the storage accessory may connect to the storage compartment through mechanical means, such as through snap fits, cantilever snap fits, annular snap fits, u-shaped snap fits, torsion snap fits, grommets, sockets, couplings, screws, screw post fasteners, sex bolt fasteners, mating fasteners, and other fasteners, while in other embodiments, simpler hanging means such as hooks, catches, clips, or even a groove and catch may be used. In one embodiment, a combination of rivets and screw post fasteners may be used. In other embodiments, the additional storage accessory may comprise a catch or fastener mechanism similar to the ones outlined above which is molded into its structure and is operationally configured to mate with the one or more connection ports on the storage compartment. The additional storage accessory should connect with at least one, but preferably two or more connection ports for added stability, depending on the size and anticipated weight of the accessory and its contents. For example, an accessory rod holder would preferably comprise two connector means in vertical alignment which can mate with and connect to two connection ports, a top and a bottom. An accessory storage compartment, however, would preferably be configured and attached such as to be connected through four or more connection ports.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope.

What is claimed is:

1. A wearable fishing rod and equipment storage system comprising:
   a. a wearable article, one or more storage compartments, and one or more fishing rod holders;
   b. wherein at least one storage compartment is attached to the wearable article and said at least one fishing rod holder is attached to said at least one storage compartment; wherein the wearable article comprises a vest which is capable of being adjusted for fit to the user; wherein the storage compartment comprises a front wall, a back wall, and a base connected to the front and back walls, wherein the front wall abuts the vest when said storage compartment is coupled to said vest, and the storage compartment defines a storage cavity; and wherein the system is configured so that a substantial portion of said storage compartment is positioned between the shoulders of a user when the system is worn.

2. The wearable fishing rod and equipment storage system of claim 1 wherein said at least one fishing rod holders is rigidly coupled to the storage compartment.

3. The wearable fishing rod and equipment storage system of claim 1 wherein said at least one fishing rod holders is molded to said at least one storage compartment.

4. The wearable fishing rod and equipment storage system of claim 1 wherein said at least one fishing rod holder is rotatably coupled to the storage compartment such that the rod holder may be rotated along an axis while remaining coupled to the storage compartment.

5. The wearable fishing rod and equipment storage system of claim 1 wherein the wearable article comprises a handle and is buoyant.

6. The wearable fishing rod and equipment storage system of claim 1 wherein the storage compartment further comprises a drain hole located in or substantially near the base.

7. The wearable fishing rod and equipment storage system of claim 1 wherein said rod holder comprises a hollow construction defined by a substantially contiguous wall with an open top and a substantially closed base, wherein the top is substantially frustoconical shaped with a top diameter and bottom diameter, the top diameter being larger than the bottom diameter, wherein said rod holder comprises a substantially cylindrical bottom which extends from the bottom of frustoconical shaped top towards the base.

8. The wearable fishing rod and equipment storage system of claim 7 wherein said rod holder further comprises an opening in the wall in the frustoconical shaped top and a drainage hole in or substantially near the base.

9. The wearable fishing rod and equipment storage system of claim 1 wherein the storage compartment further comprises two opposing sidewalls separating the front and back wall, and wherein said at least one fishing rod holder is coupled to at least one side wall of the storage compartment.

10. The wearable fishing rod and equipment storage system of claim 9 wherein storage compartment further comprises a plurality of expansion ports positioned at predefined intervals in at least one of the side wall or back wall.

11. The wearable fishing rod and equipment storage system of claim 10 further comprising at least one storage accessory configured to couple with the expansion ports, said storage accessory selected from the group comprising a storage compartment, a rod holder, a storage compartment and rod holder combination, a storage bin, a bottle holder, a camera holder, or a fishing tool holder.

12. The wearable fishing rod and equipment storage system of claim 9 comprising at least two fishing rod holders, wherein at least one fishing rod holder is coupled to said storage compartment on the exterior side of each side wall.

13. The wearable fishing rod and equipment storage system of claim 1 wherein said rod holder is coupled to the storage compartment and comprises at least one expansion port located in a spot separated from the coupling of the rod holder to the storage compartment, and said storage system further comprises least one storage accessory configured to couple with the expansion ports, said storage accessory selected from the group comprising a storage compartment, a rod holder, a storage compartment and rod holder combination, a storage bin, a bottle holder, a camera holder, or a fishing tool holder.

14. A wearable fishing rod and equipment storage system comprising:
  a. A wearable vest,
  b. a storage compartment comprising a bottom connected to a contiguous wall itself comprising two opposing side walls separated by a front wall and a back wall, each connected to the bottom; and
  c. two rod holders, each of said rod holders comprising a substantially cylindrical wall with an open top and a bottom wherein the top is either diametrically equal to or diametrically larger than the bottom; and
  d. a storage accessory selected from a second storage compartment, a third rod holder, a storage compartment and rod holder combination, a storage bin, a bottle holder, a cell phone holder, a camera holder, or a fishing tool holder;
  e. wherein said storage compartment is attached to said vest such that the vest is in contact with said front wall of the storage compartment;
  f. wherein one rod holder is connected to said storage compartment on each of said opposing side walls;
  g. wherein said storage system comprises at least one expansion port on the exterior side of said back wall or at least one rod holder; and
  h. wherein said storage accessory is coupled via said expansion port.

15. The wearable fishing rod and equipment storage system of claim 14 wherein at least one of the fishing rod holders is configured to be rotatable about an axis when it is coupled to said storage compartment.

16. The wearable fishing rod and equipment storage system of claim 14 further comprising a plurality of drain holes located in or near the bottom of the storage compartment and said rod holders.

17. The wearable fishing rod and equipment storage system of claim 14 wherein said rod holders and storage compartment are molded from a single piece of plastic.

18. A wearable fishing rod and equipment storage system comprising:
  a. a wearable article, one or more storage compartments, and one or more fishing rod holders;
  b. wherein at least one storage compartment is attached to the wearable article and said at least one fishing rod holder is attached to said at least one storage compartment; wherein the wearable article comprises a vest which is capable of being adjusted for fit to the user; wherein the storage compartment comprises a front wall, a back wall, and a base connected to the front and back walls, wherein the front wall abuts the vest when said storage compartment is coupled to said vest, and the storage compartment defines a storage cavity; and wherein the storage compartment further comprises two opposing sidewalls separating the front and back wall, and wherein said at least one fishing rod holder is coupled to at least one side wall of the storage compartment; and wherein storage compartment further comprises a plurality of expansion ports positioned at predefined intervals in at least one of the side wall or back wall.

19. The wearable fishing rod and equipment storage system of claim 18 comprising at least two fishing rod holders, wherein at least one fishing rod holder is coupled to said storage compartment on the exterior side of each side wall.

20. The wearable fishing rod and equipment storage system of claim 18 further comprising at least one storage accessory configured to couple with the expansion ports, said storage accessory selected from the group comprising a storage compartment, a rod holder, a storage compartment and rod holder combination, a storage bin, a bottle holder, a camera holder, or a fishing tool holder.

\* \* \* \* \*